United States Patent [19]

Vivian

[11] 3,933,517

[45] Jan. 20, 1976

[54] COMPOSITIONS FOR REFLOWING ORGANIC SURFACES

[75] Inventor: Thomas A. Vivian, Midland, Mich.

[73] Assignee: The Dow Chemical Company, Midland, Mich.

[22] Filed: Oct. 7, 1974

[21] Appl. No.: 512,784

Related U.S. Application Data

[63] Continuation-in-part of Ser. No. 34,527, May 4, 1970, abandoned.

[52] U.S. Cl. ............... 106/311; 106/179; 106/180; 252/171
[51] Int. Cl.² ........................................... C08K 5/02
[58] Field of Search ........... 106/311, 179, 180, 285; 252/171

[56] References Cited
UNITED STATES PATENTS

| | | | |
|---|---|---|---|
| 2,969,328 | 1/1961 | Ellenson | 252/171 |
| 3,391,084 | 7/1968 | York | 252/171 |
| 3,663,255 | 5/1972 | Vivian | 106/285 |
| 3,729,331 | 4/1973 | Vivian | 264/341 |

*Primary Examiner*—Theodore Morris
*Attorney, Agent, or Firm*—Glwynn R. Baker

[57] ABSTRACT

Compositions containing 80 to 99 percent by volume of chlorinated aliphatic hydrocarbons and 1 to 20 percent by volume of an alkylene glycol alkanoate or an alkylene glycol ether alkanoate have been found to be excellent for use in the vapor reflow of organic surfaces when the composition is employed in a superheated vaporous state.

8 Claims, No Drawings

COMPOSITIONS FOR REFLOWING ORGANIC SURFACES

CROSS-REFERENCE TO RELATED APPLICATION

The present application is a continuation-in-part of my previous application Serial No. 34,527 filed May 4, 1970 now abandoned.

BACKGROUND OF THE INVENTION

Various solvents and techniques have been used to reflow organic surfaces such as paint and thermoplastic polymers, see for example British Pat. No. 1,165,176. The basic problem in reflow operations is the lack of a solvent or combination of solvents which easily reflows the surface and does not deleteriously affect the surface in the reflowing operation. To date most solvents known have drawbacks which adversely affect the reflowed surface in one or more ways. Some cause discoloration, some cause blooming, some form a haze, some cause crazing and some cause blistering. These problems are especailly acute in the reflow of paint. Solvent compositions which reflow organic surfaces with a minimum of these drawbacks, of course, are very desirable. Thus, an intensive search has been conducted to discover a solvent combination suitable for use in commercial production and repair.

SUMMARY OF THE INVENTION

According to the present invention, compositions containing about 80 to 99 percent by volume of chlorinated aliphatic hydrocarbon boiling at a temperature below about 200° C. and about 1 to about 20 percent by volume of an alkylene glycol alkanoate, an alkylene glycol ether alkanoate or mixture thereof boiling below about 200° C. have been discovered to be extremely useful solvent compositions when employed in superheated vaporous state for reflowing thermoplastic organic surfaces. In vapor reflow applications using the solvent compositions of the invention within superheated vaporous state, fewer deleterious effects are observed than are exhibited by known compositions.

The chlorinated aliphatic hydrocarn components of the composition may suitably be any of the normally liquid chlorinated hydrocarbons that are partial solvents for the organic surface to be reflowed boiling below 200° C. These chlorinated hydrocarbons usually have 1 to about 6 carbon atoms or more with 4 or less chlorine atoms attached to the hydrocarbon chain. Representative examples of various chlorinated aliphatic hydrocarbons suitable for use in the present invention include: chlorinated alkanes such as methylene chloride, chloroform, carbon tetrachloride, 1,1- and 1,2-dichloroethane, 1,1,1- and 1,1,2-trichloroethane, various trichloropropanes, tetrachloropropanes, tetrachlorobutanes, dichloropentanes and trichlorohexanes; and the chlorinated alkenes such as 1,2-cis- and trans-dichloroethene, trichloroethene, tetrachloroethene, trichloropropenes and tetrachlorobutenes. The preferred compositions of the present invention contain chlorinated alkanes, chlorinated alkenes or mixtures thereof having 1 to 3 carbon atoms and 1 to 4 chlorine atoms, with methylene chloride, 1,2-dichloroethane, 1,1,1- and 1,1,2-trichloroethane, 1,2-cis- and trans-dichloroethene, trichloroethene, and tetrachloroethene being especially preferred. Mixtures of methylene chloride and tetrachloroethene are of special interest in the present invention, with vapor reflow of compositions containing at least 50 percent by volume of methylene chloride being especially effective, and compositions containing 65 to 80 percent methylene chloride being of greatest interest.

Although the chlorinated aliphatic hydrocarbons may comprise 80 to 99 percent of the composition of the present invention, compositions containing 85 to 98 percent by volume of chlorinated hydrocarbon are preferred. The chlorinated hydrocarbons may be stabilized against reduction by metals with minor amounts of various stabilizers which are known in the art. Such stabilizers include propylene oxide, butylene oxide, dimethoxymethane and nitromethane. The use of stabilizers is especially preferred when methylene chloride is used in the vapor reflow composition.

The second essential component of the vapor reflow composition is the alkylene glycol alkanoate or alkylene glycol ether alkanoate. These compounds have a boiling point below 200° C. and preferably contain fewer than 10 carbon atoms. The glycol alkanoates have one or both of the glycol hydroxyls esterified, whereas the glycol ether alkanoates esterify one of the hydroxyls of the glycol and etherify the remaining hydroxyl of the glycol. Representative examples of suitable glycol alkanoates and glycol ether alkanoates include: glycol alkanoates, such as ethylene glycol mono or diacetate, ethylene glycol acetate propionate, ethylene glycol mono or dibutyrate, diethylene glycol mono or diacetate, triethylene glycol monopropionate, propylene glycol mono and diacetate, propylene glycol propionate acetate and butylene glycol mono or diacetate; and glycol ether alkanoates, such as ethylene glycol ethyl ether acetate, ethylene glycol pentyl ether acetate, ethylene glycol methyl ether acetate, ethylene glycol methyl ether propionate, ethylene glycol propyl ether acetate, ethylene glycol methyl ether butyrate, diethylene glycol ethyl ether acetate, propylene glycol ethyl ether acetate, propylene glycol methyl ether acetate, propylene glycol propyl ether acetate, propylene glycol methyl ether propionate, propylene glycol methyl ether butyrate, propylene glycol butyl ether acetate, butylene glycol ethyl ether acetate, butylene glycol methyl ether acetate, butylene glycol ethyl ether butyrate and butylene glycol butyl ether acetate. Preferred glycol alkanoates have alkanoyl groups of 2 to 4 carbon atoms. Preferred glycol ether alkanoates have in addition to the preferred alkanoyl group a preferred alkoxy group of 1 to 4 carbon atoms. Compositions containing the glycol ether alkanoates are of particular interest in the invention, with compositions containing ether alkanoates of ethylene glycol being especially preferred, and ethylene glycol ethyl ether acetate being of special interest.

As noted, the concentration of the glycol alkanoate or glycol ether alkanoate may range from about 1 to about 20 percent by volume. Although concentrations of glycol ester above 20 percent by volume may be employed, these solvents are not as good for vapor reflow as those containing less than 20 percent. Preferred concentrations of glycol alkanoates and glycol ether alkanoates are about 2 to about 15 percent by volume of the total reflow mixture.

Although these two components, the chlorinated aliphatic hydrocarbon and the glycol alkanoate or glycol ether alkanoate, are the only two mandatory components of the mixture, other components may be added to the mixture without deleteriously effecting the vapor reflow characteristics of the mixture. Such suitable additives may be picked from the known reflow solvents that have the characteristics as described above for the components of the present invention, viz. a boiling point below 200°C. and the property of being at least a partial solvent for the organic surface to be reflowed.

The vapor reflow compositions of the invention are simply prepared by mixing the individual components in the proportions specified and completely vaporizing the mixture and superheating the vapors, or by mixing the vapors of the individual components and superheating the mixed vapors in such proportions. The compositions are then suitably applied as a superheated vapor to any organic surface that is at least partially soluble in the composition to remove minor imperfections from localized areas or from the entire surface. The particular composition which is most suited to the organic surface varies as different surfaces and terminal characteristics are desired. Of the various thermoplastic organic surfaces that may be reflowed by the compositions of the invention, paints including lacquers and enamels, thermoplastic resins, such as polystyrene, polybutadiene, acrylonitrile-butadiene-styrene and similar substances are preferred, with the reflow of paint being of particular interest.

In the practical application of the invention to a localized surface of a painted metal, the various components of the ultimate vapor reflow composition are preferably mixed, and fed in the proper proportions through a heating vaporizing and superheating chamber and into a passageway leading to the painted surface. The superheated vapor composition emitted from the passageway is contacted with the paint and the paint is reflowed under conditions that allow for rapid vaporization of the solvent from the treated surface. The surface is then allowed to dry and minor imperfections in the painted surface are found to have been removed, leaving a surface which appears to be substantially identical to that of the surrounding area.

SPECIFIC EMBODIMENT

A vapor reflow composition containing 70 percent by volume of methylene chloride, 20 percent tetrachloroethene and 10 percent ethylene glycol ethyl ether acetate was prepared, vaporized and superheated to 200° C. and contacted with an aluminized acrylic lacquer painted on a car body. The paint was immediately reflowed in the localized area of contact and dried rapidly to give a surface almost identical to that of the surrounding area. No buffing or other post-treatment was required to improve the surface and make it acceptable by production standards.

In the same manner as shown by the example above, other vapor reflow solvents containing 80 to 99 percent of chlorinated aliphatic hydrocarbons and 1 to 20 percent of a glycol alkanoate, glycol ether alkanoate or mixture thereof may be employed to reflow paint or a thermoplastic toy to remove imperfections in the surface and to provide a surface when dried which is essentially the same as that of the surrounding area. Also in the same manner the entire surface may be reflowed to give little or no discoloration, haze, crazing or blistering.

Representative examples of compositions that give this desired result include those containing by volume: 60 percent methylene chloride, 30 percent 1,1,1-trichloroethane and 10 percent ethylene glycol diacetate; 65 percent methylene chloride, 30 percent 1,2-dichloroethene and 5 percent diethylene glycol methyl ether acetate; 75 percent methylene chloride, 23 percent trichloroethene and 2 percent propylene glycol propionate; 60 percent 1,2-dichloroethane, 30 percent tetrachloroethene and 10 percent butylene glycol methyl ether acetate; 50 percent 1,2,3-trichloropropane, 30 percent 1,2-dichloropentane and 20 percent ethylene glycol methyl ether acetate; and 85 percent methylene chloride and 15 percent ethylene glycol methyl ether propionate.

What is claimed is:

1. A composition suitable for use as a superheated vapor for vapor reflowing plastic surfaces consisting essentially of about 50 to 99 percent of methylene chloride, 0 to 49 percent of one or more 1,2-dichloroethane, 1,1,1- and 1,1,2-trichloroethane, 1,2-cis- and trans-dichloroethene, trichloroethene, tetrachloroethene or a mixture thereof boiling below about 200°C., and about 1 to 20 percent of an alkylene glycol alkanoate, alkylene glycol ether alkanoate or a mixture thereof having a boiling point below 200°C.

2. The composition of claim 1 wherein tetrachloroethene is present in about 20 percent by weight.

3. The composition of claim 1 wherein the glycol alkanoate or glycol ether alkanoate contains up to 10 carbon atoms.

4. The composition of claim 1 wherein the glycol alkanoate contains alkanoyl groups of 2 to 4 carbon atoms.

5. The composition of claim 1 containing a glycol ether alkanoate or mixture thereof.

6. The composition of claim 1 wherein the glycol ether alkanoate has an alkanoyl group of 2 to 4 carbon atoms and an alkoxy group of 1 to 4 carbon atoms.

7. The composition of claim 1 containing ethylene glycol ethyl ether acetate.

8. The composition of claim 1 wherein the concentration of the glycol alkanoate or glycol ether alkanoate is 2 to 15 percent.

* * * * *